(12) United States Patent
Ji et al.

(10) Patent No.: US 8,722,798 B2
(45) Date of Patent: May 13, 2014

(54) THERMOSETTABLE COMPOSITION CONTAINING A COMBINATION OF AN AMPHIPHILIC BLOCK COPOLYMER AND A POLYOL AND A THERMOSET PRODUCT THEREFROM

(76) Inventors: Leiming Ji, Shanghai (CN); Yong-Jiang Li, Shanghai (CN); Ludovic Valette, Lake Jackson, TX (US)

( * ) Notice: Subject to any disclaimer, the term of this patent is extended or adjusted under 35 U.S.C. 154(b) by 114 days.

(21) Appl. No.: 13/201,630

(22) PCT Filed: Mar. 9, 2009

(86) PCT No.: PCT/CN2009/000251
§ 371 (c)(1),
(2), (4) Date: Sep. 12, 2011

(87) PCT Pub. No.: WO2010/102421
PCT Pub. Date: Sep. 16, 2010

(65) Prior Publication Data
US 2011/0319523 A1    Dec. 29, 2011

(51) Int. Cl.
*C08L 63/00* (2006.01)
*C08L 63/02* (2006.01)
*C08G 59/06* (2006.01)
*C08G 59/42* (2006.01)
*C08K 3/00* (2006.01)
*C08K 3/36* (2006.01)
*C08L 71/02* (2006.01)
*C08L 87/00* (2006.01)

(52) U.S. Cl.
USPC .............. 525/88; 525/92 A; 525/92 H; 525/93

(58) Field of Classification Search
USPC .................................. 525/88, 92 A, 92 H, 93
See application file for complete search history.

(56) References Cited

U.S. PATENT DOCUMENTS

| | | |
|---|---|---|
| 4,497,945 A | 2/1985 | Salloum et al. |
| 4,551,520 A | 11/1985 | Morris et al. |
| 4,846,905 A | 7/1989 | Tarbutton et al. |
| 5,137,990 A | 8/1992 | Corley |
| 5,382,628 A | 1/1995 | Stewart et al. |
| 5,789,482 A | 8/1998 | Eldin et al. |
| 6,451,898 B1 | 9/2002 | Tanimoto et al. |
| 6,887,574 B2 | 5/2005 | Dean et al. |
| 2004/0247881 A1 | 12/2004 | Dean et al. |
| 2008/0213489 A1* | 9/2008 | Verghese et al. .............. 427/386 |

FOREIGN PATENT DOCUMENTS

| | | |
|---|---|---|
| EP | 0126494 | 1/1984 |
| JP | 9324110 | 12/1997 |
| WO | 9801495 | 1/1998 |
| WO | 2005097893 | 10/2005 |
| WO | 2006052725 | 5/2006 |
| WO | 2006052726 | 5/2006 |
| WO | 2006052727 | 5/2006 |
| WO | 2006052729 | 5/2006 |
| WO | 2006052730 | 5/2006 |
| WO | WO 2009/018193 | * 2/2009 |
| WO | 2009079205 | 6/2009 |

OTHER PUBLICATIONS

Pham, H. Q. and Marks, M. J., Epoxy Resins, Kirk-Othmer Encyclopedia of Chemical Technology, 2004, vol. 10, pp. 347-471.

* cited by examiner

*Primary Examiner* — Jeffrey Mullis (57) ABSTRACT

A thermosettable composition including (a) at least an amphophilic block copolymer, (b) at least a polyol, (c) at least an epoxy resin containing an average at least 2 oxirane rings per molecule, (d) at least an anhydride hardener containing an average at least 1 anhydride ring per molecule, and (e) at least a catalyst; and a thermoset product prepared from said thermosettable composition.

22 Claims, 3 Drawing Sheets

THERMOSETTABLE COMPOSITION CONTAINING A COMBINATION OF AN AMPHIPHILIC BLOCK COPOLYMER AND A POLYOL AND A THERMOSET PRODUCT THEREFROM

BACKGROUND OF THE INVENTION

1. Field of the Invention

This invention relates to a thermosettable composition including an amphiphilic block copolymer, a polyol, an anhydride, an epoxide and a catalyst; and thermoset products made from such thermosettable composition. The thermoset products made from the thermosettable compositions of the present invention have improved mechanical performances, especially toughness and mechanical strength, thermosettable compositions, while maintaining high thermal resistance. The compositions of the present invention are useful in various applications such as casting, potting, and encapsulation, such as electrical and electronics applications, and composites.

2. Description of Background and Related Art

Some thermosetting resins are known to have good toughness and good mechanical properties, some thermosetting resins are known to have good thermal resistance, and some thermosetting resins are known to have good processability. However, heretofore, a thermosetting resin exhibiting each and every one of the above characteristics to the extent that such thermosetting resin can be prepared in large scale, and used in high performance applications under significant stress and moisture exposure, has not been made.

There is a need for thermosetting resins with improved mechanical properties (e.g. higher toughness and mechanical strength) while maintaining good thermal resistance and good processability of the resin. High toughness and high mechanical strength leads to less cracking and high mechanical integrity, reducing the number of defects and improving the reliability and life time of the end products. High thermal resistance enables high operation temperature. Low formulation viscosity improves processability and enables high filler loading.

Heretofore, those skilled in the art have attempted to improve the properties of thermosetting resins by adding various additives, such as flexibilizers and toughening agents, to the thermosetting resin. However, the use of conventional flexibilizers such as linear polyols in thermosetting resin only leads to a moderate improvement in toughness; and significantly reduces the thermal stability of the thermoset because of the resulting low (less than 100° C.) glass transition temperature. The use of conventional toughening agents in the thermosetting resin leads to processing issues because of the high viscosity of the resulting formulation, and because of the complexity of the phase-separation process.

For example, the use of conventional toughening agents such as liquid rubbers, core-shell particles and thermoplastic polymers, in thermosetting resins increases the toughness of the thermosetting resin at the cost of adversely affecting some other properties of the thermosetting resin such as glass transition temperature, mechanical properties, viscosity, etc. It is difficult to maintain the glass transition temperature and mechanical strength when liquid rubbers and thermoplastic polymers are employed to improve toughness; and due to the nature of core-shell particles, it is hard to fully disperse these particles into a thermosetting resin such as an epoxy resin without additional treatments.

Still, there are various prior art technologies that have been used to attempt to toughened thermosetting compositions. For example, EP126494A1 describes a composition which contains a specific group of hardeners, an epoxy resin and a thermo-plastic polymer. When combined with a structural fiber the composition produces composites which have improved impact resistance, improved tensile properties and high compressive properties. However, EP126494A1 describes a conventional toughening method by adding a thermoplastic polymer into a thermoset; and discloses the incorporation of a thermoplastic polymer into an epoxy resin system to improve its impact resistance. EP126494A1 uses a thermoplastic polymer toughening agent; it does not teach employing an amphiphilic block copolymer as the toughening agent in the epoxy resin system.

U.S. Pat. No. 4,497,945 discloses forming a tough epoxy polymer by pre-reacting a poly(oxypropylene)diol or triol with a chemical excess of an anhydride curing agent for epoxy resins. The resulting diester-diacid is then polymerized with an epichlorohydrin-bisphenol A epoxy resin. Suitable imidizole catalysts are preferred for the reactions. However, U.S. Pat. No. 4,497,945 does not disclose the use of a toughening agent; and does not teach the use of an amphiphilic block copolymer as the toughening agent in an epoxy resin system.

U.S. Pat. No. 4,551,520 discloses that polyesters of 95 to 40 mol % terephthalic acid, 5 to 60 mol % trans-4,4'-stilbenedicarboxylic acid, and at least 60 mol % 1,4-cyclohexanedimethanol can be injection molded to give shaped objects having exceptionally high impact strength and good chemical resistance. In addition, the polyesters of U.S. Pat. No. 4,551,520 can be extruded into films, spun into fibers, or blown into bottles having these properties. U.S. Pat. No. 4,551,520 does not use a toughening agent; and does not teach the use of an amphiphilic block copolymer as the toughening agent in an epoxy resin system.

U.S. Pat. No. 4,846,905 discloses a thermally-curable, one-part epoxy adhesive composition comprising: (1) a glycidyl ether epoxide having an epoxy functionality greater than one and a molecular weight between about 150 and 10,000; (2) a catalyst comprising (i) an acid of the formula $H+SbF_5X-$, wherein X is halogen, hydroxy, or —OR, and wherein —OR is the residue of an aliphatic or aromatic alcohol having a molecular weight less than about 10,000 and (ii) N,N-diethyl-o-toluidine; (3) an aliphatic or non-aromatic cyclic polyol having about 2 to 18 carbon atoms, at least two hydroxyl groups of which are primary or secondary, and being free of electron-withdrawing substituents, amine substituents, or large substituents that cause steric hindrance in the $\alpha$-position in relation to the carbon attached to the methylol group of the polyol; and (4) a toughening agent that does not react with the epoxide during curing and has an epoxide compatible component and an epoxide incompatible component.

U.S. Pat. No. 4,846,905 discloses an epoxy resin composition comprising a polyol and a toughening agent. However, U.S. Pat. No. 4,846,905 describes different toughening agents; and the toughening agents can be divided into three types:

1. A polymerized, diene, rubbery backbone or core to which is grafted a shell of an acrylic acid ester or methacrylic acid ester, monovinyl aromatic hydrocarbon, or a mixture thereof.

2. A core-shell graft copolymer wherein the core or backbone is a polyacrylate polymer having a glass transition temperature below about 0° C.

3. Elastomeric particles having a glass transition temperature below about 25° C., and have been polymerized in situ in the epoxide before mixing with the other component of the composition.

All the above three types of toughening agents (core-shell particles and elastomeric particles) differ from an amphiphilic block copolymer toughening agent. None of the prior art technology utilizes a reactive toughening agent which reacts with an anhydride and possibly with an epoxy.

U.S. Pat. No. 5,382,628 discloses thermoformed plastic articles such as frozen food trays, which exhibit unexpectedly high impact strength at low temperatures. The articles are obtained from polyester blends containing 88 to 99 weight percent of a poly(ethylene terephthalate) resin and 1 to 12 weight percent of a poly(1,4-cyclohexylenedimethylene terephthalate) resin which contains at least 30 mole percent of 1,4-cyclohexanedimethanol.

U.S. Pat. No. 5,382,628 describes thermoplastic PET materials thermoformed into plastic articles. U.S. Pat. No. 5,382,628 does not disclose the use of a thermoset formulation comprising an amphiphilic block copolymer as the toughening agent in an epoxy resin system.

WO1998001495A1 discloses epoxy resin systems having good flexibility and impact resistance that are modified to provide improved resistance to solvents. Incorporation of a polyalkyleneoxide segment of a molecular weight less than 500 provides improved chemical resistance without sacrifice of mechanical properties. To achieve this, an alkoxylated polyol with low molecular weight is reacted with a polycarboxylic acid anhydride to produce the half ester, which is then used to synthesize the flexibilized epoxy resin by forming adducts with polyglycidyl ethers. The flexibilized epoxy resins as well as the acid functionalized oligooxyalkylenes are taught in WO1998001495A1.

However, the technology in WO1998001495A1 uses a polyol modified hardener to flexibilize the network, but does not use a toughening agent. WO1998001495A1 does not teach the use of an amphiphilic block copolymer as the toughening agent in an epoxy resin system, which affords improved flexibilization and maintains Tg.

U.S. Pat. No. 5,789,482 discloses epoxy resin compositions which contain (a) at least one epoxy resin containing, on average, more than one 1,2-epoxy group per molecule, (b) an anhydride hardener for the epoxy resin (a), (c) a toughener, and (d) a compound containing two active hydrogen atoms which is capable of reacting with the epoxy resin (a) have an outstanding toughness and are suitable as casting resins, laminating resins, moulding compounds, coating compounds and encapsulation systems for electrical and electronic components.

U.S. Pat. No. 5,789,482 teaches that a core/shell polymer toughener is incorporated into the system to improve the toughness, which is different from incorporating an amphiphilic block copolymer as the toughening agent. Also, U.S. Pat. No. 5,789,482 does not contain a hydroxycarboxylic acid, a dicarboxylic acid, or a biphenol, which is a mononuclear diphenol, dihydroxy naphthaline, dihydroxy biphenyl or another binuclear aromatic compound which has a methylene, isopropylidene, O, $SO_2$ or S bridge and contains two hydroxyl groups bound to the aromatic nuclei and wherein the benzene rings may also contain halogen atoms.

WO2006052729A1 discloses a curable epoxy resin composition including (a) a thermosettable epoxy resin; and (b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms, such that when the epoxy resin composition is cured, the toughness of the resulting cured epoxy resin composition is increased. The amphiphilic block copolymer is preferably an all polyether block copolymer such as a PEO-PBO diblock copolymer or a PEO-PBO-PEO triblock copolymer.

WO2006052729A1 describes the use of amphiphilic toughening agents in epoxy resin formulations. However, the technology described in WO2006052729A1 does not teach or suggest an improvement in: (i) the flexural modulus; (ii) the tensile strength, tensile elongation, $K_{Ic}$, and flexural strain; or (iii) the Tg values.

Thus, there is still a need in the industry for thermosetting resins which show an improvement in its mechanical properties such as tensile strength and flexural strength, while increasing toughness and without significant reduction of thermal stability as defined by the glass transition temperature, especially when compared with conventional toughening technologies.

It therefore desired to provide thermoset products with improvements to one or more of the above properties and characteristics over conventional thermosets.

SUMMARY OF THE INVENTION

The present invention provides significant and surprising improvements over the aforementioned conventional thermosets.

One aspect of the present invention is directed to a thermosettable composition including (a) at least an amphiphilic block copolymer, (b) at least a polyol, (c) at least an epoxy resin containing an average at least 2 oxirane rings per molecule, (d) at least an anhydride hardener containing an average of at least 1 anhydride ring per molecule, and (e) at least a catalyst.

Another aspect of the present invention is directed to a process for making the above thermosettable composition.

Still another aspect of the present invention is directed to a cured thermoset product made by curing the above thermosettable composition.

The present invention involves using a combination of an amphiphilic block copolymer and a polyol, such as a polyether polyol or a cycloaliphatic polyol, to achieve a good balance between the toughness, the mechanic properties and thermal resistance of the resulting thermosettable composition. When compared to prior art systems without a polyol, such as a polyether polyol or cycloaliphatic polyol, the compositions of the present invention show a significantly improved toughness over the prior art systems.

BRIEF DESCRIPTION OF THE DRAWINGS

For the purpose of illustrating the present invention, and not to be limited thereby, the following drawings are provided herein to show a form of the present invention wherein:

FIGS. 1-5 demonstrate unexpected synergistic effects for mechanical or thermal performances of a resulting thermoset product when such product is prepared from a thermosettable composition comprising at least one amphiphilic block copolymer and at least one polyol blended with at least one epoxy resin.

DETAILED DESCRIPTION OF THE INVENTION

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the present invention is not limited to the specific embodiments described below, but rather; the invention includes all alternatives, modifications, and equivalents falling within the true scope of the appended claims.

Unless other wise stated, a reference to a compound or a component includes the compound or component by itself, as well as in combination with other compounds or components, such as mixtures or combinations of compounds.

As used herein, the singular forms "a," "an," and "the" include the plural reference unless the context clearly dictates otherwise.

An object of the present invention is to provide a thermosettable resin composition comprising an amphiphilic block copolymer, a polyol, an anhydride, an epoxide, a catalyst, and optionally, an inorganic filler.

Another object of the present invention is to improve the mechanical performances, especially toughness and mechanical strength, of the thermosettable resin composition, such as an epoxy/anhydride thermosettable composition, while maintaining high thermal resistance. The incorporation of an amphiphilic block copolymer and a polyol into the thermosettable resin composition significantly improves the mechanical properties such as higher toughness and higher mechanical strength, without a significant negative effect on the glass transition temperature.

Still another object of the present invention is to provide a cured thermoset product having improved mechanical properties (for example, higher toughness and mechanical strength) while maintaining good thermal resistance and good processability. The high toughness and high mechanical strength of the present invention product provides less cracking and high mechanical integrity, reducing the number of defects and improving the reliability and life time of the end product. In addition, a high thermal resistance enables the compositions of the present invention to be used at a high operation temperature.

Another object of the present invention is to improve curable compositions used in casting, potting, and encapsulation, such as electrical and electronics applications; for example electrical casting/coating and encapsulation applications and composite coatings. The present invention may be useful in applications requiring high toughness. Examples for such applications include composites, laminates or reactive coating applications.

In its broadest scope, the present invention is directed to a curable or thermosettable composition including (a) at least one amphiphilic block copolymer, (b) at least one polyol, (c) at least one epoxy resin containing an average at least 2 oxirane rings per molecule, (d) at least one anhydride hardener containing an average at least 1 anhydride ring per molecule, and (e) at least one catalyst.

In the present invention, the utilization of a combination of an amphiphilic block copolymer and a polyol, advantageously provides an improvement in mechanical properties to the thermosettable composition while increasing its toughness and without significantly reducing its thermal stability. None of the prior has utilized the combination of components of the present invention such as the combination of the amphiphilic block copolymer and the polyol.

The amphiphilic block copolymer, component (a) useful in the present invention may include various amphiphilic block copolymers such as the amphiphilic polymers described in, for example, U.S. Pat. No. 6,887,574 and WO 2006/052727; incorporated herein by reference. For example, amphiphilic polyether block copolymers used in embodiments disclosed herein may include any block copolymer containing an epoxy resin miscible block segment; and an epoxy resin immiscible block segment.

In some embodiments, suitable block copolymers include amphiphilic polyether diblock copolymers such as, for example, poly(ethylene oxide)-b-poly(butylene oxide) (PEO-PBO) or amphiphilic polyether triblock copolymers such as, for example, poly(ethylene oxide)-b-poly(butylene oxide)-b-poly(ethylene oxide) (PEO-PBO-PEO).

Other suitable amphiphilic block copolymers include, for example, poly(ethylene oxide)-b-poly(ethylene-alt propylene) (PEO-PEP), poly(isoprene-ethylene oxide) block copolymers (PI-b-PEO), poly(ethylene propylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-b-methylmethacrylate) block copolymers (PI-b-PEO-b-PMMA); and mixtures thereof.

Other useful amphiphilic block copolymers are disclosed in PCT Patent Application Publications WO2006/052725, WO2006/052726, WO2006/052727, WO2006/052729, WO2006/052730, and WO2005/097893, U.S. Pat. No. 6,887,574, and U.S. Patent Application Publication No. 20040247881; each of which is incorporated herein by reference.

The preferred examples of the above block copolymers are poly(ethylene oxide)-b-poly(butylene oxide) (PEO-b-PBO) amphiphilic block copolymer, PEO-b-PBO-b-PEO amphiphilic block copolymer and a mixture of PEO-b-PBO and PEO-b-PBO-b-PEO. Additional examples of block copolymers useful in the present invention include the block copolymers, such as silicone polyether, describe in U.S. patent application Ser. No. 61/014,560, entitled "Thermosetting Compositions Comprising Silicone Polyethers, Their Manufacture, and Uses", filed Jul. 13, 2007, by Valette et al., incorporated herein by reference.

The amphiphilic copolymer possesses at least two kinds of block segments, one is miscible with epoxy resin and the other is immiscible with epoxy resin. Generally, the amphiphilic block copolymers useful in the present invention include amphiphilic block copolymers that contain at least one epoxy resin miscible block segment and at least one epoxy resin immiscible block segment. In one embodiment of the present invention, the immiscible block segment comprises at least one polyether structure provided that the polyether structure of said immiscible block segment containing at least one or more alkylene oxide monomer units having at least four carbon atoms. Accordingly, the amphiphilic block copolymer (a) of the composition is an amphiphilic polyether block copolymer containing at least one epoxy resin miscible block segment and at least one epoxy resin immiscible block segment; wherein the miscible block segment comprises at least one polyether structure.

Generally, the ratio of the miscible segments of the amphiphilic block copolymer to the immiscible segments of the amphiphilic block copolymer is from about 10:1 to about 1:10.

The amphiphilic block copolymer of the composition is preferably selected from the group consisting of a diblock, a linear triblock, a linear tetrablock, a higher order multiblock structure; a branched block structure; or a star block structure.

One embodiment of the composition contains an amphiphilic block copolymer wherein the miscible block segment may contain a polyethylene oxide block, a propylene oxide block, or a poly(ethylene oxide-co-propylene oxide) block; and preferably wherein at least one of the miscible segments of the amphiphilic block copolymer (a) is a poly (ethylene oxide). The immiscible block segment of the amphiphilic block copolymer may contain a polybutylene oxide block, a polyhexylene oxide block, a polydodecylene oxide block, or a polyhexadecylene oxide block, and preferably, wherein at least one of the immiscible segments of the amphiphilic block copolymer (a) is a poly(butylene oxide).

A more specific example of the amphiphilic block copolymer useful in the composition of the present invention may include a poly(ethylene oxide)-b-poly(butylene oxide) or poly(ethylene oxide)-b-poly(butylene oxide)-b-poly(ethylene oxide); and preferably a poly(ethylene oxide)-b-poly(hexylene oxide).

In another embodiment, the composition of the present invention may contain an amphiphilic block copolymer (a) comprising a blend of two or more block copolymers.

In general, the amphiphilic block copolymer (a) used in the composition may have a molecular weight of from about 1000 to about 30000;

The amount of the amphiphilic block copolymer used in the thermosettable compositions described herein may depend on a variety of factors including the equivalent weight of the polymers, as well as the desired properties of the products made from the composition. In general, the concentration of the amphiphilic block copolymer (a) may be in the range of between about 0.1 wt % to about 20 wt %, preferably between about 0.2 wt % to about 15 wt %, more preferably between about 0.3 wt % to about 10 wt %, and most preferably between about 0.4 wt % to about 8 wt % based on the weight of the total organic compound. If the concentration of the amphiphilic block copolymer is above 20 wt %, the mechanical properties are significantly decreased. If the concentration is below 0.1 wt %, there is no further improvement in toughness the resulting composite product.

In general, the polyol, component (b), useful in the present invention may be any of the well known polyols known in the art. Preferably, the polyol may be an aliphatic polyol. The aliphatic polyol may contain from 2 to about 20 carbon atoms. In one embodiment, the aliphatic polyol may be selected from the groups of linear aliphatic polyols and branched aliphatic polyols.

In a preferred embodiment, the polyol may be a cycloaliphatic polyol, and more preferably, the cycloaliphatic polyol may contain from 6 to about 20 carbon atoms. The cycloaliphatic polyol may include for example 1,3-cyclohexanedimethanol, 1,4-cyclohexanedimethanol or mixtures thereof; wherein the weight percent of 1,4-cyclohexanedimethanol may be from 0% to about 100%.

As an illustration of one embodiment of the present invention, the polyol component (b) useful in the present invention may be a compound of the following Formula (I):

Formula (I)

where X is hydrogen, a branched or linear alkyl group of from 1 to about 10 carbon atoms or an alkyl group of from 1 to about 10 carbon atoms substituted by hydroxyl groups, and n is an integer number from 1 to about 200.

The polyol, component (b), has an average hydroxyl equivalent weight between 20 and 10000, preferably between 30 and 4000, more preferably between 40 and 2000, and most preferably between 100 and 500. The average hydroxyl functionality of the polyol is strictly higher than 1, preferably higher than 1.2, more preferably higher than 1.5. The average hydroxyl functionality of the polyol is lower than 10, preferably lower than 6, more preferably lower than 4. Most preferred average hydroxyl functionality is about 2.

The concentration of the polyol may be chosen between 0.1% to 40%, preferably between 0.2% to 20%, more preferably between 0.3% to 15%, and most preferably between 0.5% to 10% based on the weight of the total organic compound. If the concentration of the polyol is above 40%, the glass transition temperature is significantly decreased. If the concentration of the polyol is below 0.1%, there is no obvious improvement in mechanical properties, combined with a loss in toughness.

The weight ratio of the amphiphilic block polymer (a) to the polyol (b) is chosen between 50:1 to 1:50, preferably between 20:1 to 1:40, more preferably between 15:1 to 1:30, and most preferably between 10:1 to 1:20. Above and below these ranges, the synergy observed between the polyol and the block copolymer is no longer visible and the properties are similar to the ones obtained with a single component.

The thermosettable composition of the present invention includes at least one epoxy resin component (c). Epoxy resins are compounds containing at least one vicinal epoxy group. The epoxy resin may be saturated or unsaturated, aliphatic, cycloaliphatic, aromatic or heterocyclic and may be substituted. The epoxy resin may also be monomeric or polymeric.

Preferably the epoxy resin component is a polyepoxide. Polyepoxide as used herein refers to a compound or mixture of compounds containing more than one epoxy moiety. Polyepoxide as used herein includes partially advanced epoxy resins that is, the reaction of a polyepoxide and a chain extender, wherein the reaction product has, on average, more than one unreacted epoxide unit per molecule. Aliphatic polyepoxides may be prepared from the known reaction of epihalohydrins and polyglycols. Other specific examples of aliphatic epoxides include trimethylpropane epoxide, and diglycidyl-1,2-cyclohexane dicarboxylate. Preferable compounds which can be employed herein include, epoxy resins such as, for example, the glycidyl ethers of polyhydric phenols, that is, compounds having an average of more than one aromatic hydroxyl group per molecule such as, for example, dihydroxy phenols, biphenols, bisphenols, halogenated biphenols, halogenated bisphenols, alkylated biphenols alkylated bisphenols, trisphenols, phenol-aldehyde novolac resins, substituted phenolaldehyde novolac resins, phenol-hydrocarbon resins, substituted phenol-hydrocarbon resins and any combination thereof.

Optionally, the epoxy resins used in the resin composition of the present invention is at least one halogenated or halogen-containing epoxy resin compound. Halogen-containing epoxy resins are compounds containing at least one vicinal epoxy group and at least one halogen. The halogen can be, for example, chlorine or bromine, and is preferably bromine. Examples of halogen-containing epoxy resins useful in the present invention include diglycidyl ether of tetrabromobisphenol A and derivatives thereof. Examples of the epoxy resin useful in the present invention include commercially available resins such as D.E.R.™ 500 series, commercially available from The Dow Chemical Company.

The halogen-containing epoxy resin may be used alone, in combination with one or more other halogen-containing epoxy resins, or in combination with one or more other different non-halogen-containing epoxy resins. The ratio of halogenated epoxy resin to non-halogenated epoxy resin is preferably chosen to provide flame retardancy to the cured thermoset resin. The weight amount of halogenated epoxy resin which may be present may vary depending upon the particular chemical structure used (due to the halogen content in the halogenated epoxy resin), as is known in the art. It also depends on the fact that other flame retardants might be present in the composition, including the curing agent and optional additives. The preferred halogenated flame retardants are brominated compound, preferably diglycidyl ether of tetrabromobisphenol A and derivatives thereof.

The epoxy resin compounds other than the halogen-containing epoxy resin utilized in the composition of the present invention may be, for example, an epoxy resin or a combination of epoxy resins prepared from an epihalohydrin and a phenol or a phenol type compound, prepared from an epihalohydrin and an amine, prepared from an epihalohydrin and a carboxylic acid, or prepared from the oxidation of unsaturated compounds.

In one embodiment, the epoxy resins utilized in the compositions of the present invention include those resins produced from an epihalohydrin and a phenol or a phenol type compound. The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (i.e. the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

In another embodiment, the epoxy resins utilized in the compositions of the invention preferably include those resins produced from an epihalohydrin and bisphenols, halogenated bisphenols, hydrogenated bisphenols, novolac resins, and polyalkylene glycols, or combinations thereof. Examples of bisphenol A based epoxy resins useful in the present invention include commercially available resins such as D.E.R.™ 300 series and D.E.R.™ 600 series, commercially available from The Dow Chemical Company. Examples of epoxy Novolac resins useful in the present invention include commercially available resins such as D.E.N.™ 400 series, commercially available from The Dow Chemical Company.

In another embodiment, the epoxy resin compounds utilized in the compositions of the invention preferably include those resins produced from an epihalohydrin and resorcinol, catechol, hydroquinone, biphenol, bisphenol A, bisphenol AP (1,1-bis(4-hydroxyphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins, tetramethylbiphenol, tetramethyl-tetrabromobiphenol, tetramethyltribromobiphenol, tetrachlorobisphenol A, or combinations thereof. Preferably, the epoxy resin composition of the present invention contains diglycidyl ether of tetrabromobisphenol A.

The preparation of such compounds is well known in the art. See Kirk-Othmer, Encyclopedia of Chemical Technology, 3rd Ed., Vol. 9, pp 267-289. Examples of epoxy resins and their precursors suitable for use in the compositions of the invention are also described, for example, in U.S. Pat. Nos. 5,137,990 and 6,451,898, which are incorporated herein by reference.

In another embodiment, the epoxy resins utilized in the compositions of the present invention include those resins produced from an epihalohydrin and an amine. Suitable amines include diaminodiphenylmethane, aminophenol, xylene diamine, anilines, and the like, or combinations thereof.

In another embodiment, the epoxy resins utilized in the compositions of the present invention include those resins produced from an epihalohydrin and a carboxylic acid. Suitable carboxylic acids include phthalic acid, isophthalic acid, terephthalic acid, tetrahydro- and/or hexahydrophthalic acid, endomethylenetetrahydrophthalic acid, isophthalic acid, methylhexahydrophthalic acid, and the like or combinations thereof.

In another embodiment the epoxy resin refers to an advanced epoxy resin which is the reaction product of one or more epoxy resins components, as described above, with one or more phenol type compounds and/or one or more compounds having an average of more than one aliphatic hydroxyl group per molecule as described above. Alternatively, the epoxy resin may be reacted with a carboxyl substituted hydrocarbon, which is described herein as a compound having a hydrocarbon backbone, preferably a C1-C40 hydrocarbon backbone, and one or more carboxyl moieties, preferably more than one, and most preferably two. The C1-C40 hydrocarbon backbone may be a straight- or branched-chain alkane or alkene, optionally containing oxygen. Fatty acids and fatty acid dimers are among the useful carboxylic acid substituted hydrocarbons. Included in the fatty acids are caproic acid, caprylic acid, capric acid, octanoic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

The epoxy resin, Component (a), of the present invention may be selected from, for example, oligomeric and polymeric diglycidyl ether of bisphenol A, oligomeric and polymeric diglycidyl ether of tetrabromobisphenol A, oligomeric and polymeric diglycidyl ether of bisphenol A and tetrabromobisphenol A, epoxydized phenol Novolac, epoxydized bisphenol A Novolac, oxazolidone-modified epoxy resins and mixtures thereof.

In another embodiment, the epoxy resin is the reaction product of a polyepoxide and a compound containing more than one isocyanate moiety or a polyisocyanate. Preferably, the epoxy resin produced in such a reaction is an epoxy-terminated polyoxazolidone.

The anhydride hardener, component (d), includes phthalic acid anhydride and derivatives, nadic acid anhydride and derivatives, trimellitic acid anhydride and derivatives, pyromellitic acid anhydride and derivatives, benzophenonetetracarboxylic acid anhydride and derivatives, dodecenylsuccinic acid anhydride and derivatives, poly(ethyloctadecanedioic acid) anhydride and derivatives, and the like, and these can be used alone or in an admixture thereof. Hexahydrophthalic anhydride, methyl hexahydrophthalic anhydride, tetrahydrophthalic anhydride, methyl tetrahydrophthalic-anhydride, nadic acid anhydride, and methyl nadic acid anhydride are particularly suitable for this invention.

The epoxy (c) to anhydride hardener (d) molar ratio is chosen between 2:1 to 1:2, preferably between 1.5:1 to 1:1.5, more preferably between 1.3:1 and 1:1.2, and most preferably is about 1.05:1. Above and below these ranges, the maximum conversion of the reactive groups is limited. Residual reactive groups (epoxy groups if the ratio is above 2:1 and anhydride groups if the ratio is below 1:2) remain in the cured network, leading to detrimental effects on the material properties (e.g. lower Tg, reduced mechanical properties and chemical stability).

Particularly suitable catalysts, component (e), useful in the present invention are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate(ethyltriphenylphosphonium acetate.acetic acid complex), ethyltriphenylphosphonium tetrahaloborate, tetrabutylphosphonium chloride, tetrabutylphosphonium acetate, tetrabutylphosphonium diacetate(tetrabutylphosphonium acetate.acetic acid complex), tetrabutylphosphonium tetrahaloborate, butyltriphenylphosphonium tetrabromobisphenate, butyltriphenylphosphonium bisphenate, butyltriphenylphosphonium bicarbonate, benzyltrimethylammonium chloride, benzyltrimethylammonium hydroxide, benzyltrimethylammonium tetrahaloborate, tetramethylammonium hydroxide, tetrabutylammonium hydroxide, tetrabutylammonium tetrahaloborate, and mixtures thereof and the like.

Other suitable catalysts (e) include ammonium compounds such as, for example, triethylammonium chloride, triethylammonium bromide, triethylammonium iodide, triethylammonium tetrahaloborate, tributylammonium chloride, tributylammonium bromide, tributylammonium iodide, tributylammonium tetrahaloborate, N,N'-dimethyl-1,2-diaminoethane.tetrahaloboric acid complex, and mixtures thereof and the like.

Other suitable catalysts (e) include quaternary and tertiary ammonium phosphonium, and arsonium adducts or complexes with suitable non-nucleophilic acids such as, for example, fluoboric, fluoarsenic, fluoantimonic, fluophosphoric, perchloric, perbromic, periodic, mixtures thereof and the like.

Other suitable catalysts (e) include tertiary amines such as, for example, triethylamine, tripropylamine, tributylamine, 2-methylimidazole, benzyldimethylamine, mixtures thereof and the like.

The concentration of the catalyst (e) is generally between about 0.001% by weight to about 10% by weight, preferably between about 0.01% to about 5%, more preferably between about 0.1% to about 2%, based on the weight of the total organic compounds. Above this range, the reaction is too fast and the formulation cannot be processed under conventional processing conditions. Below this range, the reaction is too slow and the formulation cannot be processed under conventional processing conditions.

The thermosettable composition of the present invention may optionally further include one or more fillers or fibrous reinforcements. When the composition contains an inorganic filler, the inorganic filler can be selected among any conventional inorganic filler. Examples of such inorganic fillers include, but are not limited to silica, talc, quartz, mica, and flame retardant fillers such as aluminum hydroxide, aluminum trihydroxide, magnesium hydroxide, or boehmite. Preferably, the inorganic filler may be silica, and talc, and mixtures thereof.

The concentration of the filler, such as inorganic filler, is preferably chosen between about 1% to about 95%, based on the total weight of the composition, preferably between about 2% and about 90%, more preferably between about 10% and about 85%, even more preferably between about 20% and about 80%, and even more preferably between about 30% and about 75%.

In general, at least one average dimension of the inorganic filler particles is below about 1 mm, preferably below about 100 micron, more preferably below about 50 micron, and even more preferably below about 10 micron, and above about 2 nm, preferably above about 10 nm, more preferably above about 20 nm, and even more preferably above about 50 nm. Fillers large than 100 micron create defect in the thermoset network, leading to poor thermo-mechanical properties.

The thermosettable composition of the present invention may optionally further include a second reactive resin different from the epoxy resin (c) and different from the hardener (d). The second reactive resins useful in the present invention may form a part of the cross-linked network. Examples of such resins include isocyanate resins, (meth)acrylic resins, phenolic resins, melamine resins, vinylic resins, vinylester resins, styrenic resins, silicone resins, and polyester resins. Hardeners may be chosen from, but are not limited to, amines, phenolic resins, carboxylic acids, and polyol resins. In embodiments wherein the reactive resin comprises an isocyanate, at least one hardener is preferably chosen from polyols.

The concentration of the additional reactive resin is generally between about 0.5% by weight to about 50% by weight, preferably between about 1% to about 40%, more preferably between about 2% to about 30%, and most preferably between about 5% to about 25% based on the weight of the total organic compounds. Above 50%, the additional reactive resin becomes the main resin. Below 0.5%, the concentration is not large enough to make a difference in properties.

The thermosettable composition of the present invention may optionally further include at least one solvent. The solvents useful in the present invention may include for example ketones, alcohols, water, glycol ethers, aromatic hydrocarbons and mixtures thereof. Preferred solvents include acetone, methyl ethyl ketone, methyl isobutyl ketone, cyclohexanone, methylpyrrolidinone, propylene glycol monomethyl ether, propylene glycol monomethyl ether acetate, ethylene glycol monomethyl ether, methyl amyl ketone, methanol, isopropanol, toluene, xylene, dimethylformamide (DMF) and the like. A single solvent may be used, but also separate solvents may be used for one or more components. Preferred solvents for the epoxy resins and curing agents are ketones, including acetone, methylethyl ketone and the like, and ether alcohols such as methyl, ethyl, propyl or butyl ethers of ethylene glycol, diethylene glycol, propylene glycol or dipropylene glycol, ethylene glycol monomethyl ether, or 1-methoxy-2-propanol, and the respective acetates. Preferred solvents for the catalyst of the present invention include alcohols, ketones, water, dimethylformamide (DMF), glycol ethers such as propylene glycol monomethyl ether or ethylene glycol monomethyl ether, and combinations thereof.

The concentration of the solvent is generally between about 0% to about 80%, preferably between about 1% to about 60%, more preferably between about 2% to about 50%, and most preferably between about 5% to about 40% based on the weight of the total organic compounds.

The thermosettable composition according to the present invention may optionally further include one or more additives chosen from additional flame retardants, additional toughening agents different from the amphiphilic block copolymer (a), polyols and glycols different from the polyol (b), curing inhibitors, wetting agents, colorants, thermoplastics, processing aids, dyes, UV-blocking compounds, and fluorescent compounds; and mixtures thereof. This list is intended to be exemplary and not limiting. The preferred additives for the, formulation of the present invention may be optimized by the skilled artisen.

The concentration of the additional additives is generally between about 0 wt % to about 50 wt %, preferably between about 0.01 wt % to about 20 wt %, more preferably between about 0.05 wt % to about 15 wt %, and most preferably between about 0.1 wt % to about 10 wt % based on the weight of the total composition. Below about 0.01 wt %, the additives generally do not provide any further significant advantage to the resultant thermoset product; and above about 20 wt %, the properties improvement brought by these additives remains relatively constant.

The thermoset product (i.e. the cross-linked product made from the thermosettable composition) of the present invention shows a glass transition temperature higher than about 70° C., preferably higher than about 80° C., more preferably higher than about 90° C., more preferably higher than about 100° C., and most preferably higher than about 110° C. The thermoset product of the present invention shows a glass transition temperature lower than 300° C., preferably lower than 280° C., more preferably lower than 250° C., and most preferably lower than 230° C. In one embodiment, the thermoset product of the present invention shows a glass transition temperature from about 70° C. to about 300° C. Below about 70° C., the technology described in this application does not provide any further significant advantage versus the conventional technology described in the prior art; and above about 300° C., the technology described in the present application generally would lead to a very brittle network which is not suitable for the applications within the scope of the present application.

The thermoset product of the present invention shows a toughness measured by $K_{Ic}$ value higher than about 1.0 MPa·m$^{1/2}$, preferably higher than about 1.2 MPa·m$^{1/2}$, more preferably higher than about 1.4 MPa·m$^{1/2}$, more preferably higher than about 1.6 MPa·m$^{1/2}$, and most preferably higher than about 1.8 MPa·m$^{1/2}$ when formulated with 50% wt of silica fillers. Below the $K_{Ic}$ value range about 1.0 MPa·m$^{1/2}$, no added benefit or advantage of the present invention is realized versus conventional compositions. The thermoset product of the present invention shows a toughness measured by $K_{Ic}$ value lower than 5.0 MPa·m$^{1/2}$, preferably lower than 4.0 MPa·m$^{1/2}$, more preferably lower than 3.5 MPa·m$^{1/2}$, and most preferably lower than 3.0 MPa·m$^{1/2}$ when formulated with 50% wt of silica fillers. In one embodiment, the thermoset product of the present invention shows a toughness measured by $K_{Ic}$ value of from about 1.0 MPa·m$^{1/2}$ to about 5.0 MPa·m$^{1/2}$. Below about 1.0 MPa·m$^{1/2}$, the technology described in the present application does not provide any further significant advantage versus the conventional technology described in the prior art; and above about 5.0 MPa·m$^{1/2}$, the technology described in the present application generally would lead to thermoplastic-like network which is not suitable for the applications within the scope of the present application.

The thermoset product of the present invention shows a tensile strength higher than about 40 MPa, preferably higher than about 60 MPa, more preferably higher than about 70 MPa, and most preferably higher than about 75 MPa when formulated with 50% wt of silica fillers. The thermoset product of the present invention shows a tensile strength lower than about 500 MPa, preferably lower than 400 MPa, more preferably lower than 300 MPa, and most preferably higher than 150 MPa when formulated with 50% wt of silica fillers. In one embodiment, the thermoset product of the present invention shows a tensile strength of from about 40 MPa to about 500 MPa. Below about 40 MPa, no added benefit or advantage of the present invention is realized versus conventional compositions; and above about 500 MPa, the technology described in the present application generally would lead to a very brittle network which is not suitable for the applications within the scope of the present application.

The thermoset product of the present invention shows a flexural strength higher than 120 MPa, preferably higher than 125 MPa, more preferably higher than 130 MPa, and most preferably higher than 135 MPa when formulated with 50% wt of silica fillers. The thermoset product of the present invention shows a flexural strength lower than 500 MPa, preferably lower than 400 MPa, more preferably lower than 300 MPa, and most preferably higher than 200 MPa when formulated with 50% wt of silica fillers. In one embodiment, the thermoset product of the present invention shows a flexural strength of from about 120 MPa to about 500 MPa. Below about 120 MPa, the technology described in the present application does not provide any further significant advantage versus the conventional technology described in the prior art; and above about 500 MPa, the technology described in the present application generally would lead to a very brittle network which is not suitable for the applications within the scope of the present application.

The thermoset product of the present invention shows an elongation at break higher than about 1.5%, preferably higher than about 1.6%, more preferably higher than about 1.8%, and most preferably higher than about 2.0% when formulated with 50% wt of silica fillers. The thermoset product of the present invention shows an elongation at break lower than about 100%, preferably lower than about 80%, more preferably lower than about 50%, and most preferably lower than about 20% when formulated with 50% wt of silica fillers. Below about 1.5%, no added benefit or advantage of the present invention is realized versus conventional compositions; and above about 100%, the technology described in this application generally would lead to thermoplastic-like network which is not suitable for the applications in the scope of this application.

The components of the formulation or composition of the present invention may be admixed in any order to provide the thermosettable composition of the present invention.

The formulation of the present invention composition containing an amphiphilic block copolymer, a polyol, an anhydride, a catalyst and an epoxide, can be cured under conventional processing conditions to form a thermoset. The resulting thermoset displays excellent thermo-mechanical properties, such as good toughness and mechanical strength, while maintaining high thermal stability.

The process to produce the thermoset products of the present invention may be performed by gravity casting, vacuum casting, automatic pressure gelation (APG), vacuum pressure gelation (VPG), infusion, filament winding, lay up injection, transfer molding and the like.

The temperature to cure the thermosettable composition may be selected generally between about 20° C. to about 300°

C., preferably between about 25° C. to about 250° C., and more preferably between about 30° C. to about 220° C. Below about 20° C., the temperature may be too low to ensure a sufficiently fast reaction under conventional processing conditions; and above about 300° C., the temperature may be too high and the thermosettable material may degrade.

The gelation of the thermosettable composition may be performed at a temperature of generally higher than about 40° C., preferably higher than about 50° C., more preferably higher than about 60° C., even more preferably higher than about 70° C., and most preferably higher than about 80° C. The gelation of the thermosettable composition may be performed at a temperature of generally lower than about 300° C., preferably lower than about 280° C., more preferably lower than about 250° C., even more preferably lower than about 220° C., and most preferably lower than about 180° C. In one embodiment, the gelation of the thermosettable composition may be performed at a temperature of generally from about 40° C. to about 300° C. Below about 40° C., the temperature may be too low to ensure a sufficiently fast reaction under conventional processing conditions. Above about 300° C., the temperature is too high and the thermosetting material may degrade, may evaporate, or the gelation may be too fast and may create internal stress and defects.

The postcure of the thermosettable composition may be performed at temperature of generally higher than about 100° C., preferably higher than about 110° C., more preferably higher than about 120° C., even more preferably higher than about 130° C., and most preferably higher than about 140° C. The postcure of the thermosettable composition may be performed at a temperature of generally lower than about 300° C., preferably lower than about 280° C., more preferably lower than about 260° C., even more preferably lower than about 250° C., and most preferably lower than about 240° C. In one embodiment, the postcure of the thermosettable composition may be performed at a temperature of generally from about 100° C. to about 300° C. Below about 100° C., the temperature may be too low to ensure sufficient cross-linking density (incomplete reaction). Above about 300° C., the temperature is too high and the thermosetting material may degrade, and internal stress and defects may be created.

The curing of the thermosettable composition may be carried out for a predetermined period of time sufficient to cure the composition. For example, the curing time may be chosen between about 1 minute to about 96 hours, preferably between about 5 minutes to about 48 hours, and more preferably between about 10 minutes to about 24 hours. Below a period of time of 1 minute, the time may be too short to ensure sufficient reaction under conventional processing conditions; and above 96 hours, the time is too long to be practical or economical.

The formulations of the present invention are very suitable for casting, potting, encapsulation, and impregnation processes.

The thermoset products of the present invention may be used in various applications including for example in casting, potting, and encapsulation, such as electrical and electronics applications; for example electrical casting/coating and encapsulation applications and composite coatings.

The final thermoset displays superior mechanical and thermal properties. The incorporation, of a mixture of an amphiphilic block copolymer and a polyol into an epoxy resin system containing an anhydride hardener and a catalyst significantly improves the mechanical properties such as higher toughness and mechanical strength, without a significant negative effect on the glass transition temperature. Such formulations are very suitable for casting, potting, encapsulation, and impregnation process. The final thermoset displays superior mechanical and thermal properties.

EXAMPLES

The following examples and comparative examples further illustrate the present invention in detail but are not to be construed to limit the scope thereof.

Various terms, designations and raw materials used in the following examples are explained herein below:

DYD 128 (from Dalian QiHua) is a diglycidyl ether of bisphenol A (DGEBA) liquid epoxy resin with an equivalent epoxy weight of 185. The viscosity of this epoxy resin is about 12000 cP at 25° C.

Methyl tetrahydrophthalic anhydride (MTHPA) with a purity of 99% is used as an anhydride hardener (available from Orient Chemical Company).

Poly(ethylene oxide)-b-poly(butylene oxide)-b-poly(ethylene oxide) (PEO-PBO-PEO) is an amphiphilic block copolymer. The poly(ethylene oxide) block segment of the block copolymer is an epoxy miscible block, and the poly (butlyene oxide) block segment of the block copolymer is an epoxy immiscible block. This amphiphilic block copolymer has a molecular weight of about 3000 and is available from The Dow Chemical Company.

The first polyol is a 50/50 mixture of 1,3-cyclohexane dimethanol and 1,4-cyclohexane dimethanol (CHDM), and is available from The Dow Chemical Company.

The second polyol is a poly(ethylene glycol) (PEG) with a molecular weight of 400, and is available from Sino Chemicals.

The inorganic filler is silica filler with a lower grain size ($d_{10\%}$) of 2 µm, a medium grain size ($d_{50\%}$) of 13 µm and a upper grain size ($d_{90\%}$) of 52 µm. The average diameter of the silica filler is 20 µm. available from JiuLi Hua.

BYKA530 is used as a defoamer, and is available from BYK.

The following standard analytical equipments, methods and test procedures are used in the Examples:

The viscosity of an uncured formulation is measured on a Research Equipment (London) LTD cone and plate viscometer at 25° C. and 50° C., respectively.

The glass transition temperature (Tg) is measured according to the procedure in ISO 11357-2.

Tensile properties are measured according to the procedure in ISO 527.

Flexure properties are measured according to the procedure in ISO 178.

The fracture toughness of an epoxy resin is characterized in terms of the critical-stress-intensity factor, K1c, following the procedure in ASTM D 5045-99.

Example 1-4 and Comparative Examples A-D

Formulations of several resin systems used in the Examples are described in Table I.

TABLE I

Formulation of Resin Systems

| Formulation | Epoxy/Hardener (molar ratio) | | | | | | | |
|---|---|---|---|---|---|---|---|---|
| | 1:0.95 Example 1 | 1:0.95 Example 2 | 1:0.95 Example 3 | 1:0.95 Example 4 | 1:0.95 Comparative Example A | 1:0.95 Comparative Example B | 1:0.95 Comparative Example C | 1:0.95 Comparative Example D |
| DGEBA (g) | 99.0 | 99.0 | 99.0 | 99.0 | 99.0 | 99.0 | 99.0 | 99.0 |
| MTHPA (g) | 84.4 | 84.4 | 84.4 | 84.4 | 84.4 | 84.4 | 84.4 | 84.4 |
| BYK A530(g) | 1.0 | 1.0 | 1.0 | 1.0 | 1.0 | 1.0 | 1.0 | 1.0 |
| PEO-PBO-PEO (g) | 3.8 | 1.9 | 3.8 | 3.8 | 3.8 | | | |
| CHDM (g) | 9.4 | 9.4 | 4.7 | | | 9.4 | | |
| PEG (g) | | | | 9.4 | | | 9.4 | |
| Silica Filler (g) | 197.6 | 195.7 | 192.9 | 197.6 | 188.2 | 193.8 | 193.8 | 185.4 |
| Total | 395.2 | 391.4 | 385.8 | 395.2 | 393.2 | 387.6 | 387.6 | 370.8 |

In the above formulations in Table I, the content of silica filler was fixed at a concentration of 50 wt % for all formulations. The molar ratio between the epoxy component and the hardener component of the formulations was fixed at a molar ratio of about 1.05:1 in all formulations.

In the above formulations in Table I, all of the organic components were first blended together and then the inorganic components were blended into each formulation using a high speed mixer (2000 rpm, ambient temperatures, 30 minutes). A BYK DISPERMAT WDB-1611 disperser was used to disperse the inorganic filler into the resin formulations. The formulations were then degassed. Degassing was conducted under vacuum at ambient temperature until no bubble was visible. The molds were prepared between glass plated protected with a demolding agent, clamped together with a silicon spacer. The formulations were heated to 80° C. and then poured into the mold, and special care was taken to avoid entrapment of air bubbles. Castings were made by cruing the molds containing the formulations. Castings were cured in an oven for 2 hours (h) at 100° C., 2 h at 120° C. and 2 h at 160° C. In order to avoid the internal stress, castings were slowly cooled down in the oven for 2 h.

The thermal mechanical properties of the cured castings of epoxy resin toughened with amphiphilic block copolymer and cycloaliphatic diol were measured in accordance with the general procedures previously described above; and the results are shown in Table II.

TABLE II

Properties.

| Sample name | Viscosity @ 25° C. (cP) | Tg (° C.) | Tensile Strength (MPa) | Elongation at break (%) | Flexural Strength (MPa) | Flexure strain at break (%) | $K_{1c}$ (MPa/m$^2$) |
|---|---|---|---|---|---|---|---|
| Example 1 | 11680 | 107 | 78 | 2.4 | 140 | 2.9 | 2.2 |
| Example 2 | 9028 | 119 | 76 | 2.0 | 141 | 2.7 | 1.8 |
| Example 3 | 3976 | 111 | 77 | 2.0 | 139 | 2.7 | 1.8 |
| Example 4 | 3212 | 106 | 76 | 2.0 | 136 | 2.8 | 1.9 |
| Comparative Example A (prior art from WO2006/52729) | 4376 | 120 | 73 | 1.9 | 133 | 2.3 | 1.8 |
| Comparative Example B | 15500 | 109 | 78 | 1.6 | 140 | 2.2 | 1.6 |
| Comparative Example C | 3110 | 107 | 75 | 1.7 | 135 | 2.2 | 1.5 |
| Comparative Example D | 3840 | 123 | 72 | 1.4 | 130 | 2.0 | 1.4 |

Comparison of Example 1 with Comparative Examples

When compared with Comparative Example A, Example 1 leads to higher mechanical strength as confirmed by the higher tensile and flexural strengths at break. Toughness and elongation and flexure strain at break of Example 1 are significantly improved. The glass transition temperature (Tg) is reduced relative to comparative example A. The Tg is reduced, but this decrease is acceptable for the application.

When compared with Comparative Example B, Example 1 leads to better toughness and processability as confirmed by the higher $K_{Ic}$ and lower viscosity. Elongation and flexure strain at break are significantly improved. The Tg and the mechanical strength are similar to those of Comparative Example B.

When compared with Comparative Example C, Example 1 leads to higher mechanical strength as confirmed by the higher tensile and flexural strengths at break. Elongation and flexure strain at break and toughness of Example 1 are significantly improved.

When compared with Comparative Example D, Example 1 leads to much higher mechanical strength as confirmed by the higher tensile and flexural strengths at break. Toughness and elongation and flexure strain at break of Example 1 are significantly improved. The Tg is reduced, but this decrease is acceptable for the application.

Comparison of Example 2 with Comparative Examples

When compared with Comparative Example A, Example 2 leads to higher mechanical strength as confirmed by the higher tensile and flexural strengths at break. Elongation and flexure strain at break of Example 1 are improved. The toughness and Tg of Example 1 are similar to those of Comparative Example A.

When compared with Comparative Example B, Example 2 leads to better toughness and thermal resistance as confirmed by the higher $K_{Ic}$ and Tg. Elongation and flexure strain at break and processability are improved. The mechanical strength of Example 2 is similar to that of Comparative Example B.

When compared with Comparative Example C, Example 2 leads to higher mechanical strength, higher toughness, higher Tg and higher elongation and flexure strain at break.

When compared with Comparative Example D, Example 2 leads to much higher mechanical strength and toughness. Elongation and flexure strain at break of Example 2 are significantly improved. The Tg is maintained.

Comparison of Example 3 with Comparative Examples

When compared with Comparative Example A, Example 3 leads to higher mechanical strength as confirmed by the higher tensile and flexural strengths at break. Elongation and flexure strain at break and viscosity of Example 1 are improved. The toughness of Example 3 is similar to that of Comparative Example A.

When compared with Comparative Example B, Example 3 leads to better toughness and processability as confirmed by the higher $K_{Ic}$ and lower viscosity. Elongation and flexure strain at break are improved. The mechanical strength and Tg of Example 3 are similar to those of Comparative Example B.

When compared with Comparative Example C, Example 3 leads improved performance in all properties.

When compared with Comparative Example D, Example 3 leads to much higher mechanical strength and toughness. Elongation and flexure strain at break of Example 3 are significantly improved.

Comparison of Example 4 with Comparative Examples

When compared with Comparative Example A, Example 4 leads to higher mechanical strength and toughness as confirmed by the higher tensile and flexural strengths at break and higher $K_{IC}$. Elongation and flexure strain at break and processability of Example 4 are improved.

When compared with Comparative Example B, Example 4 leads to better toughness and processability as confirmed by the higher $K_{Ic}$ and lower viscosity. Elongation and flexure strain at break are improved. The mechanical strength and Tg of Example 4 are similar to those of Comparative Example B.

When compared with Comparative Example C, Example 4 leads better toughness and elongation and flexure strain at break. The mechanical strength, processability and glass transition temperature of Example 4 are similar to those of Comparative Example C.

When compared with Comparative Example D, Example 4 leads to improved performance in all properties except the Tg. The Tg is reduced, but this decrease is acceptable for the application.

The Examples may also be compared based on the data described in FIGS. 1-5. With reference to FIGS. 1-5, there is shown several embodiments of the present invention. The figures demonstrate the unexpected synergistic effect when an amphiphic block copolymer such as for example PEO-PBO-PEO and a polyol such as for example CHDM or PEG are blended together and added to an epoxy resin. The resulting mechanical or thermal performances are superior when compared with the prediction obtained from the conventional rule of mixture (additive performances).

Figure 1:
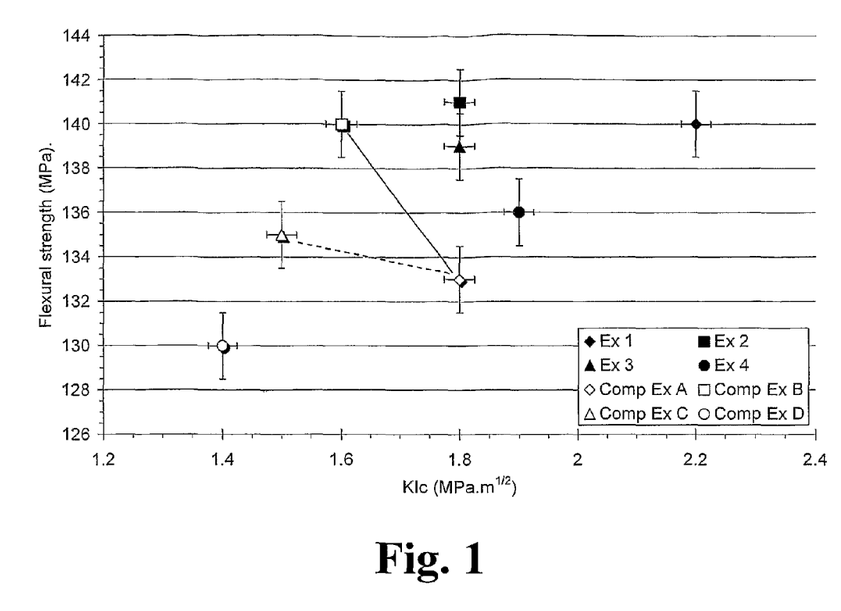
FIG. 1 is a graphical illustration showing flexural strength as a function of toughness ($K_{Ic}$).

FIG. 1 shows flexural strength as a function of toughness ($K_{Ic}$). In FIG. 1, the experimental error was ±0.025 MPa·m$^{1/2}$ for $K_{Ic}$ and ±1.5 MPa for flexural strength. The solid line represents the rule of mixture (additive properties) between Comparative Example A (pure PEO-PBO-PEO) and Comparative Example B (pure CHDM). The dashed line represents the rule of mixture (additive properties) between Comparative Example A (pure PEO-PBO-PEO) and Comparative Example C (pure PEG).

When compared with the prediction obtained from the conventional rule of mixture (additive performances), toughness ($K_{Ic}$) of the systems containing mixture of PEO-PBO-PEO and polyols (CHDM or PEG) is significantly better while at least maintaining similar flexural stress, or is at least similar while significantly increasing flexural stress.

Figure 2:
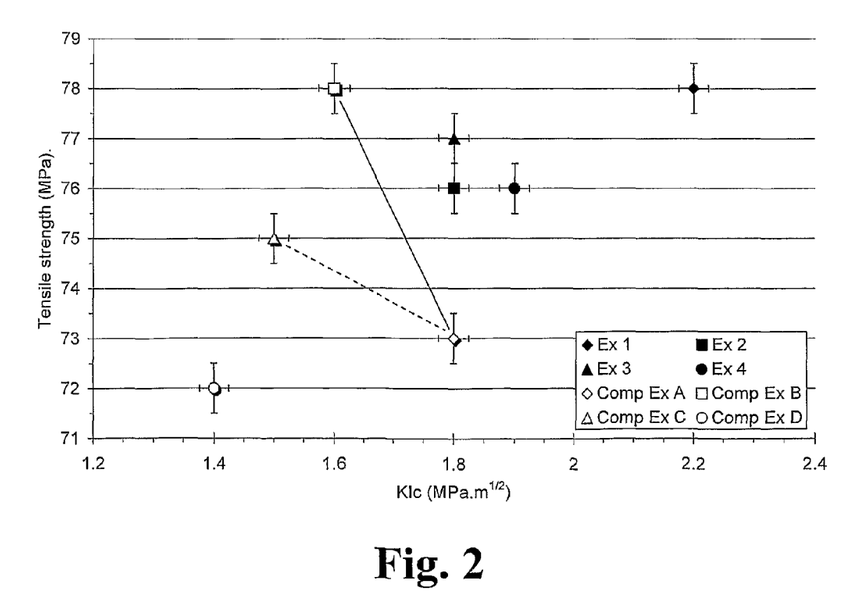
FIG. 2 is a graphical illustration showing tensile strength as a function of toughness ($K_{Ic}$).

FIG. 2 shows tensile strength as a function of toughness ($K_{Ic}$). The experimental error was ±0.025 MPa·m$^{1/2}$ for $K_{Ic}$ and ±0.5 MPa for tensile strength. The solid line represents the rule of mixture (additive properties) between Comparative Example A (pure PEO-PBO-PEO) and Comparative Example B (pure CHDM). The dashed line represents the rule of mixture (additive properties) between Comparative Example A (pure PEO-PBO-PEO) and Comparative Example C (pure PEG).

When compared with the prediction obtained from the conventional rule of mixture (additive performances), toughness ($K_{Ic}$) of the systems containing mixture of PEO-PBO-PEO and polyols (CHDM or PEG) is significantly better while at least maintaining similar tensile stress, or is at least similar while significantly increasing tensile stress.

Figure 3:
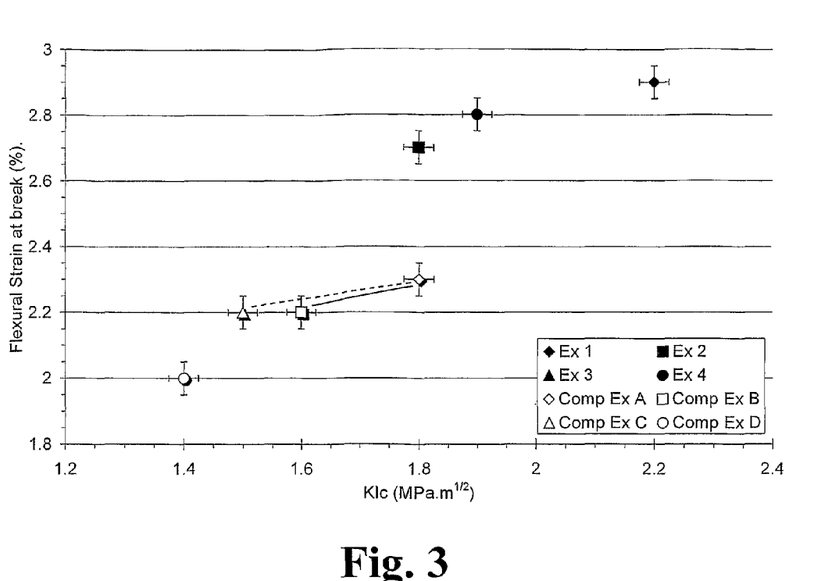
FIG. 3 is a graphical illustration showing flexural strain at break as a function of toughness ($K_{Ic}$).

FIG. 3 shows flexural strain at break as a function of toughness ($K_{Ic}$). The experimental error was ±0.025 MPa·m$^{1/2}$ for $K_{Ic}$ and ±0.05% for flexural strain. The solid line represents the rule of mixture (additive properties) between Comparative Example A (pure PEO-PBO-PEO) and Comparative Example B (pure CHDM). The dashed line represents the rule of mixture (additive properties) between Comparative Example A (pure PEO-PBO-PEO) and Comparative Example C (pure PEG).

When compared with the prediction obtained from the conventional rule of mixture (additive performances), toughness ($K_{Ic}$) of the systems containing mixture of PEO-PBO-PEO and polyols (CHDM or PEG) is significantly better while at least maintaining similar flexural strain, or is at least similar while significantly increasing flexural strain.

Figure 4:
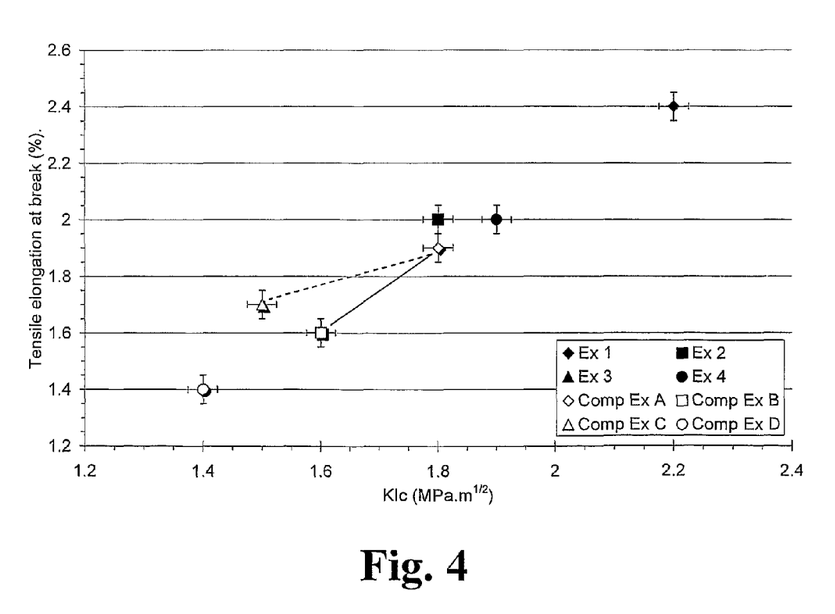
FIG. 4 is a graphical illustration showing tensile elongation at break as a function of toughness ($K_{Ic}$).

FIG. 4 shows tensile elongation at break as a function of toughness ($K_{Ic}$) The experimental error was ±0.025 MPa·m$^{1/2}$ for $K_{Ic}$ and ±0.05% for tensile elongation. The solid line represents the rule of mixture (additive properties) between Comparative Example A (pure PEO-PBO-PEO) and Comparative Example B (pure CHDM). The dashed line represents the rule of mixture (additive properties) between Comparative Example A (pure PEO-PBO-PEO) and Comparative Example C (pure PEG).

When compared with the prediction obtained from the conventional rule of mixture (additive performances), toughness ($K_{Ic}$ of the systems containing mixture of PEO-PBO-PEO and polyols (CHDM or PEG) is significantly better while at least maintaining similar tensile elongation, or is at least similar while significantly increasing tensile elongation.

Figure 5:
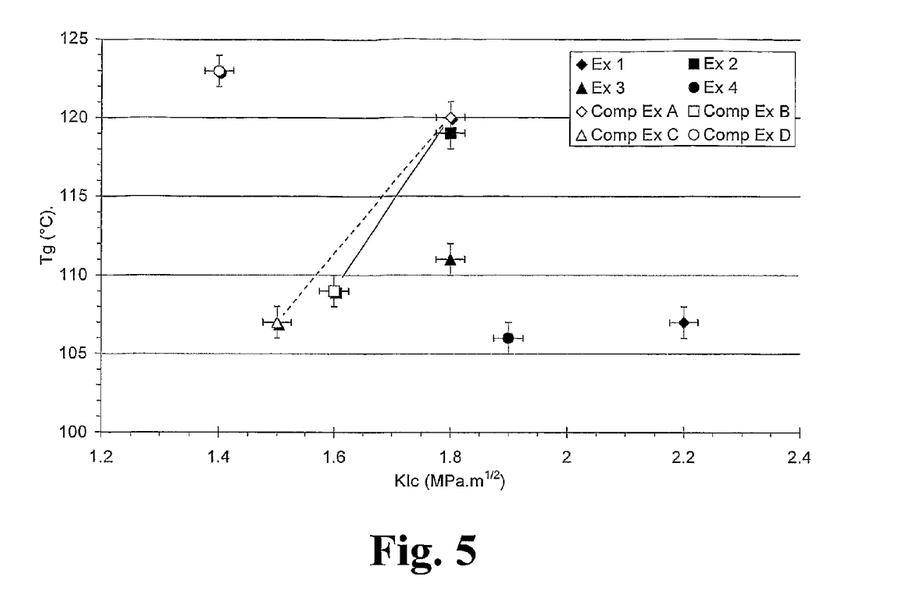
FIG. 5 is a graphical illustration showing Tg as a function of toughness ($K_{Ic}$).

FIG. 5 shows Tg as a function of toughness ($K_{Ic}$). The experimental error was ±0.025 MPa·m$^{1/2}$ for $K_{Ic}$ and ±1° C. for Tg. The solid line represents the rule of mixture (additive properties) between Comparative Example A (pure PEO-PBO-PEO) and Comparative Example B (pure CHDM). The dashed line represents the rule of mixture (additive properties) between Comparative Example A (pure PEO-PBO-PEO) and Comparative Example C (pure PEG).

When compared with the prediction obtained from the conventional rule of mixture (additive performances), toughness ($K_{Ic}$) of the systems containing mixture of PEO-PBO-PEO and polyols (CHDM or PEG) is significantly better while at least maintaining similar Tg, or is at least similar while significantly increasing Tg.

It will be obvious to persons skilled in the art that certain changes may be made in the methods described above without departing from the scope of the present invention. It is therefore intended that all matter herein disclosed be interpreted as illustrative only and not as limiting the scope of protection sought. Moreover, the present invention is not to be limited by the specific examples set forth above including the tables to which they refer. Rather, these examples and the tables they refer to are illustrative of the present invention.

What is claimed is:

1. A thermosettable composition comprising
   (a) at least one amphiphilic block copolymer, wherein the amphiphilic block copolymer is an amphiphilic polyether block copolymer containing at least one epoxy resin miscible block segment and at least one epoxy resin immiscible block segment, wherein the immiscible block segment comprises at least one polyether structure provided that the polyether structure of said immiscible block segment containing at least one or more alkylene oxide monomer units having at least four carbon atoms,
   (b) at least one polyol, wherein the polyol is an aliphatic polyol having from 2 to about 20 carbon atoms or wherein the polyol is a cycloaliphatic polyol having from 6 to 20 carbon atoms,
   (c) at least one epoxy resin containing an average at least 2 oxirane rings per molecule,
   (d) at least one anhydride hardener containing an average at least 1 anhydride ring per molecule, and
   (e) at least one catalyst;
   wherein the weight ratio of the amphiphilic block copolymer (a) to the polyol (b) is from about 20:1 to about 1:40;
   wherein the molar ratio of the epoxy resin (c) to the anhydride hardener (d) is from about 2:1 to bout 1:2; and
   wherein said thermosettable composition has the characteristic that upon being cured forms thermoset product having a glass transition temperature higher than about 70° C., and a fracture toughness in terms of critical-stress-intensity factor, $K_{1c}$, value higher than about 1.0 MPa·m$^{1/2}$ when the thermosettable composition is formulated with about 50 weight percent of silica fillers.

2. The composition according to claim 1, wherein the polyol (b) is partially or fully pre-reacted with an anhydride (f) to form an half-ester, the anhydride (f) being different from or the same as the anhydride hardener (d).

3. The composition according to claim 1, wherein the amphiphilic polyether block copolymer is selected from the group consisting of a diblock, a linear triblock, a linear tetrablock, a higher order multiblock structure; a branched block structure; or a star block structure.

4. The composition according to claim 1, wherein the miscible block segment contains a polyethylene oxide block, a propylene oxide block, or a poly(ethylene oxide-co-propylene oxide) block.

5. The composition according to claim 1, wherein the immiscible block segment contains a polybutylene oxide block, a polyhexylene oxide block, a polydodecylene oxide block, or a polyhexadecylene oxide block.

6. The composition according to claim 1, wherein the at least one of the miscible segments of the amphiphilic block copolymer (a) is a poly(ethylene oxide).

7. The composition according to claim 1, wherein the at least one of the immiscible segments of the amphiphilic block copolymer (a) is a poly(butylene oxide).

8. The composition according to claim 1, wherein the amphiphilic block copolymer (a) is polyethylene oxide)-b-poly(butylene oxide) or poly(ethylene oxide)-b-poly(butylene oxide)-b-poly(ethylene oxide).

9. The composition according to claim 1, wherein the amphiphilic block copolymer (a) is polyethylene oxide)-b-poly(hexylene oxide).

10. The composition according to claim 1, wherein the amphiphilic block copolymer (a) is a blend of two or more block copolymers.

11. The composition according to claim 1, wherein the amphiphilic block copolymer (a) has a number average molecular weight of from about 1000 to about 30000.

12. The composition according to claim 1, wherein the weight ratio of the miscible segments of the amphiphilic block copolymer to the immiscible segments of the amphiphilic block copolymer is from about 10:1 to about 1:10.

13. The composition according to claim 1, wherein the amphiphilic block copolymer (a) is present in the composition in an amount of from about 0.1 weight percent to about 20 weight percent based on the total weight of the components in the composition.

14. The composition according to claim 1, wherein the polyol is selected from the groups of linear aliphatic polyols and branched aliphatic polyols.

15. The composition according to claim 1, wherein the cycloaliphatic polyol includes 1,3-cyclohexanedimethanol, 1,4-cyclohexanedimethanol or their mixtures with the weight percent of 1,4-cyclohexanedimethanol from 0 weight percent to 100 weight percent.

16. The composition according to claim 1, wherein the polyol (b) is present in an amount from about 0.1 weight percent to about 40 weight percent, based on the weight of the total components in the composition.

17. The composition according to claim 1, wherein the epoxy resin (c) includes diglycidyl ether of bisphenol A, derivatives of diglycidyl ether of bisphenol A, diglycidyl ether of bisphenol F, derivatives of diglycidyl ether of bisphenol F, or combinations thereof.

18. The composition according to claim 1, including further a filter.

19. The composition according to claim 18, wherein the filler is selected from the group consisting of silica, talc, quartz, mica, aluminum trihydroxide, magnesium hydroxide, and boehmite.

20. The composition according to claim 18, wherein the concentration of the filler is chosen between about 1 weight percent to about 95 weight percent, based on the total weight of the composition.

21. A thermoset product which is the reaction product of a thermosettable composition containing:
(a) at least one amphiphilic block copolymer, wherein the amphiphilic block copolymer is an amphiphilic polyether block copolymer containing at least one epoxy resin miscible block segment and at least one epoxy resin immiscible block segment,
(b) at least one polyol, wherein the polyol is an aliphatic polyol having from 2 to about 20 carbon atoms or wherein the polyol is a cycloaliphatic polyol having from 6 to 20 carbon atoms, wherein the immiscible block segment comprises at least one polyether structure provided that the polyether structure of said immiscible block segment containing at least one or more alkylene oxide monomer units having at least four carbon atoms,
(c) at least one epoxy resin containing an average at least 2 oxirane rings per molecule,
(d) at least one anhydride hardener containing an average at least 1 anhydride ring per molecule, and
(e) at least one catalyst;
wherein the weight ratio of the amphiphilic block copolymer (a) to the polyol (b) is from about 20:1 about 1:40;
wherein the molar ratio of the epoxy resin (c) anhydride hardener (d) is from about 2:1 about 1:2; and
wherein said thermosettable composition has the characteristic that upon being cured forms a thermoset product having a glass transition temperature higher than about 70° C., and a fracture toughness in terms of critical-stress-intensity factor, $K_{1c}$, value higher than about 1.0 MPa·m$^{1/2}$ when the thermosettable composition is formulated with about 50 weight percent of silica fillers.

22. A process for preparing a thermosettable composition comprising admixing:
(a) at least one amphiphilic block copolymer, wherein the amphiphilic block copolymer is an amphiphilic polyether block copolymer containing at least one epoxy resin miscible block segment and at least one epoxy resin immiscible block segment, wherein the immiscible block segment comprises at least one polyether structure provided that the polyether structure of said immiscible block segment containing at least one or more alkylene oxide monomer units having at least four carbon atoms,
(b) at least one polyol, wherein the polyol is an aliphatic polyol having from 2 to about 20 carbon atoms or wherein the polyol is a cycloaliphatic polyol having from 6 to 20 carbon atoms,
(c) at least one epoxy resin containing an average at least 2 oxirane rings per molecule,
(d) at least one anhydride hardener containing an average at least 1 anhydride ring per molecule, and
(e) at least one catalyst;
wherein the weight ratio of the amphiphilic block copolymer (a) to the polyol (b) is from about 20:1 to about 1:40;
wherein the molar ratio of the epoxy resin (c) to the anhydride hardener (d) is from about 2:1 to about 1:2; and
wherein said thermosettable composition upon being cured has the characteristic that it forms a thermoset product having a glass transition temperature hither than about 70° C., and a fracture toughness in terms of critical-stress-intensity factor, $K_{1c}$, value higher than about 1.0 MPa·m$^{1/2}$ when the thermosettable composition is formulated with about 50 weight percent of silica fillers.

* * * * *

UNITED STATES PATENT AND TRADEMARK OFFICE
CERTIFICATE OF CORRECTION

| | | |
|---|---|---|
| PATENT NO. | : 8,722,798 B2 | Page 1 of 1 |
| APPLICATION NO. | : 13/201630 | |
| DATED | : May 13, 2014 | |
| INVENTOR(S) | : Leiming Ji et al. | |

It is certified that error appears in the above-identified patent and that said Letters Patent is hereby corrected as shown below:

On the title page, change item "(76)" to read item --(75)--

On the title page, insert item (73), --Dow Global Technologies LLC
2040 Dow Center
Midland, Michigan 48674--

Signed and Sealed this
Second Day of December, 2014

Michelle K. Lee
*Deputy Director of the United States Patent and Trademark Office*